United States Patent [19]

Gaigl

[11] Patent Number: 4,901,589
[45] Date of Patent: Feb. 20, 1990

[54] DRIVE AND POSITIONING SYSTEM FOR A SLIDE

[76] Inventor: Karl-Josef Gaigl, Stahringer Str. 10a, D-7768 Stockach 14, Fed. Rep. of Germany

[21] Appl. No.: 251,710
[22] PCT Filed: Nov. 2, 1987
[86] PCT No.: PCT/DE87/00494
  § 371 Date: Jun. 29, 1988
  § 102(e) Date: Jun. 29, 1988
[87] PCT Pub. No.: WO88/03238
  PCT Pub. Date: May 5, 1988

[30] Foreign Application Priority Data

Oct. 31, 1986 [DE] Fed. Rep. of Germany ....... 3637195
Feb. 14, 1987 [DE] Fed. Rep. of Germany ....... 3704669

[51] Int. Cl.$^4$ .................. F16H 21/44; B29C 45/42
[52] U.S. Cl. ........................................ 74/104; 74/96; 74/110; 425/444; 425/451.3; 425/556
[58] Field of Search ................. 74/96, 104, 110; 425/444, 451.3, 556

[56] References Cited

U.S. PATENT DOCUMENTS

| 2,789,683 | 4/1957 | Stahl | 198/110 |
| 4,332,176 | 6/1982 | Rust | 74/110 |
| 4,377,953 | 3/1983 | Hagen | 74/96 X |
| 4,712,437 | 12/1987 | Gaigl | 74/104 X |

FOREIGN PATENT DOCUMENTS

| 3444168 | 6/1986 | Fed. Rep. of Germany . |
| 1562169 | 2/1969 | France . |
| 2049536 | 3/1971 | France . |

Primary Examiner—Allan D. Herrmann
Attorney, Agent, or Firm—Bachman & LaPointe

[57] ABSTRACT

Device for transforming a rotary movement of a drive element eccentrically arranged about a rotary spindle into a linear movement of a slide means with an assured guidance during the linear movement and fixed end positions, whereby for the linear guidance of the slide means the drive element constructed as a guide pulley or the like engages in a guide slot, but leaves the latter on reaching the slide means end position, characterized in that on the slide means (3) are provided two rollers (14,15) or similar stops, which in the end positions of slide means (3) in each case slide onto and engage on a bar (32,33) or similar reference edge, the bars (32,33) freeing the rollers (14,15) during the linear guidance of slide means (3) and while maintaining a spacing (b).

39 Claims, 6 Drawing Sheets

DRIVE AND POSITIONING SYSTEM FOR A SLIDE

BACKGROUND OF THE INVENTION

The invention relates to a device for transforming a rotary movement of a drive element eccentrically arranged about a rotation axis into a linear movement of a slide with assured guidance during the linear movement and fixed end positions, whereby for the linear guidance of the slide the drive element constructed as a guide pulley or the like engages in a guide slot, which it leaves on reaching the slide end position.

Such a device is e.g. shown in DE-OS 34 44 168, where together with the drive element engaging in the guide slot a further drive element rotates about the same center and engages in at least one reception slot when the drive element is disengaged from the guide channel. If the end position is to be assured, then said guide channel must have the same mean radius as the further drive element about the center. Initially the slide constructed as a curved plate is admittedly well held in the end position. However, if the other drive element is more deeply introduced into the reception slot, then there is an increasing deterioration of the securing of the slot in its end position, because the movement direction of the drive element becomes increasingly similar to the movement direction of the slide.

The problem of the present invention is to develop a device of the aforementioned type, in which the slide is secured in precisely defined end positions, but is otherwise freely movable.

SUMMARY OF THE INVENTION

According to the invention this problem is solved in that on the slide or on a rotary arm connected to the slide are provided two rollers or similar stops which, in the slide end positions, in each case slide onto and engage a bar or similar reference edge and while maintaining a spacing, the bars release the rollers during the linear guidance of the slide.

The advantage of the invention is that said rollers can be arranged at random points of the slide or rotary arm and that the position of the bars is completely independent of the slide or rotary arm. The only association necessary between the bars and rollers is that the latter leave the bar associated therewith when the guide pulley enters the guide slot. It is then unimportant as to the extent to which the slide travels over its end position, because the fixing of the end position is taken over by the bars which are independent of the slide or the rotary arm. Preferably the stops are constituted by rollers or runners, but within the scope of the invention it is also possible to use different stops, such as e.g. rail strips, bolts or the like.

In order to ensure a holding of the rollers or stops on the particular bar with each roller should be associated a further stop directed counter to the pressing direction of the roller with respect to the bar. In a simple embodiment this could be constituted by a further roller, rail, etc, which engages the particular roller on the bar. Thus, the bar is received between the two stops. It is for example also possible, if desired, to curve the bar in such a way that the slide follows said curvature in its end position. If for example the slide is used for moving a removal device in and out between two mold halves of a plastic injection molding machine, the consequently removed objects can be set down further away from the machine.

However, if an already reached end position of the slide is to be precisely maintained, then it is sufficient to fix to the slide or to the rotary arm further stop pins or bolts, which meet a fixed stop at the instant at which the particular roller slides onto the bar. In this case, the bar should be straight and run at right angles to the movement direction of the slide. It is advantageous for readjusting certain inaccuracies of fit to construct the stop pins in an adjustable manner.

Obviously, in place of further stops, the bars can be constructed as U-shaped slots, into which slides the particular roller. However, this would lead to a considerable negative friction between the roller and the U-profile, which does not occur in the other, preferred stop configuration.

The guide pulley is preferably moved by means of a pinion, which meshes a rack and either the rack is moved relative to the pinion or the pinion relative to the rack. It is a question of whether the slide is for example mounted on a movable mold half and a working implement is to move in and out for said mold half, or whether it is mounted on the fixed mold half. The rack is in each case associated with other mold half.

Preferably the bars are connected to the rack, generally on the side remote from the teeth. They project over the rack, so that when the rollers travel over the particular control edge of the bar, they can also slide over the rack.

If the rotary pin, pinion and slide are arranged together on or in an assembly block, this leads to a compact device, which can be easily assembled and is easily adjustable with respect to the rack or the bars. In the case of correct setting, the roller determining the end position leaves its bar at the instant when the guide pulley enters the guide slot. The precise guidance of the slide is then taken over by the guide pulley while the roller passes through the opening between the two bars and slides away over the rack. Towards the end of the guidance by the guide pulley, the second roller also slides through the opening between the two bars, but then runs up onto the bar associated therewith. The bars need not be located in a line, but could instead be displaced with respect to one another. They must merely form a passage for the second roller, so that the latter can engage behind its bar with respect to the other roller.

The aforementioned device has a rigid mechanical coupling as a result of the stops and the guide pulley engaging in the guide slot and it can be desirable to move the pulley also independently of a drive means, such as a rack and pinion which normally moves the same, or to completely disengage it from the operation of the machine tool.

For example, when eliminating faults and for carrying out repairs, it may be necessary to move the slide into one of its end positions and fix it there. According to the invention, this function is fulfilled by a device, which at least comprises a locking bolt, which cooperates with a detent in the locking position. The locking bolt and a cross-bolt must rest on a support formed by a profile strip and can be raised therefrom counter to the tension of a spring for releasing the locking joint. Raising takes place by means of an eccentrically rotatable bolt, the profile strip having a fulcrum between said bolt and the support.

Since, however, both during the guidance of the slide and also in its end position, always either rollers engage with the bars or the guide slot with the guide pulley, for providing the possibility of a manual displacement either one roller must be raisable, so that it can slide over the bar associated therewith, or the guide slot must be raisable. According to a preferred embodiment both are possible. For reasons of simplicity the profile strip is connected by means of a joint with a further strip, which at its remote end has a fulcrum to the slide and an intermediate elongated hole, in which engages a crossbolt connected to the roller. On rotating the eccentrically mounted bolt, then simultaneously the locking bolt is lowered and a roller is raised.

If in this case the guide pulley is disengaged from the guide slot, the slide can be manually moved into its outer end position. However, by means of the eccentrically mounted bolt, it should also be possible to raise one leg of the guide slot, so that also the guide pulley is free.

It also falls within the scope of the invention to place a further slide on the first-mentioned slide, a pivot forming with the slide a rotary spindle and said pivot rolls on a rack fixed in the direction of travel of the slide with respect to the other and on the other hand meshes with a rack fixed to the mounted slide. As a result it is possible to transform a relatively smaller movement of the first slide into a larger path of the second slide. The choice of ratio is essentially dependend on the pinion diameter.

Both the first and the second slides can carry the corresponding handling means for performing the working processes between for example mold two halves of an injection molding machine. It may also be necessary to mount a third slide on the second slide, which is for example movable in the direction of the opening stroke of the mold of the injection molding machine. This further movement of the third slide e.g. takes place pneumatically, so that the handling means can be guided closer to its associated mold part.

In the aforementioned embodiments, it has been found that considerable maintanance is required during operation to the slide, which is directly moved by the guide pulley. It requires permanent lubrication, particularly in the rails, dry running not being possible. In addition, in many cases precautions must be taken to ensure a transmission of the relatively short slide movement to further slides. This increases the material expenditure of the device and also its weight, which has an unfavorable influence on its dynamics. The consequence is higher wear. Moreover, the dirt particles produced by permanent lubrication have an unfavorable influence on injection molding machines, which are for example to be used in a clean room. Furthermore, as a result of the compactness of the complete slide drive, the user is bound by a specific positioning with respect to the machine tool so that he cannot seek the location which is most favorable from the forces standpoint.

These disadvantages are eliminated by a further embodiment of the invention, in which the slides and the slide drive are disengaged and are merely connected by means of a guide rod. Therefore further variations are possible with regards the location of the individual device parts. As a result of the guide rod or the additional use of further linkages, the movements of the slide drive can be more easily transformed to the slide movement. According to the invention the slide drive is brought about by a rotary arm, on which are then provided the rollers.

In the represented embodiment said rotary arm for example performs a pivotal movement of only approximately 80° and, as a function of the rotary arm length, there can be a corresponding desired travel of the slide.

This rotary arm has a fulcrum with a slide casing which, for reasons of simplicity, is mounted on a mold half of the machine tool. At this fulcrum it is possible to use ball bearings, which require no maintenance and which are hermetically sealed, so that neither dirt or dust particles are produced during the pivoting of the rotary arm.

In the case of this arrangement, it is also possible to provide slides for the gripping tools, which are not guided in rails and can instead run dry. There is then no need for permanent lubrication to the slide.

On the rotary arm are provided two channel strips, which once again form the guide slot for the guide pulley. The configuration of eccentrically arranged guide pulleys, rack, pinion, etc, corresponds to the aforementioned embodiments. The only modifications to the movement sequence is that the rotary movement of the guide pulleys is not directly transformed into a linear movement of the slide and instead the pivotal movement of the rotary arm is interposed. However, there is no slide for transforming a shorter linear movement to a longer linear movement of a second or even a third slide, which leads to a considerable cost saving.

According to the invention, it must also be possible to disengage this slide drive from the injection molding machine movement. For this purpose, a channel strip is so constructed that it can be drawn out of the engagement area of the guide pulleys. This preferably takes place by means of e.g. a piston rod of a pneumatic cylinder, which is connected to the channel strip and displaces same along the rotary arm in a corresponding guide. For reasons of simplicity, said pneumatic cylinder is connected to the rotary arm.

The removal of the channel strip from the engagement area of the guide pulleys ensures that the guide pulley during a rotation, i.e. during a movement of the machine tool in each case pivots the rotary arm in such a way that the gripping tool or the slide carrying the latter is moved out of the area between the two mold halves. However, as a result of an opposite movement of the mold halves, i.e. during closing, the rotary arm is not carried along by the guide pulley, because said channel strip has been disengaged. This arrangement ensures that the gripping tool is always moved out of the area between two mold halves on closing the latter and is not exposed to damage.

For the disengagement of said slide drive, according to the invention devices are coupled to the cylinder or linked with the channel strip movement, which e.g. bring about a raising of a roller and/or a lowering of a detent.

For reasons of simplicity, by extending the piston rod out of the cylinder a link strip is moved and which, by means of corresponding lever arrangements, is connected to the roller or a detent. This makes it possible to raise the roller in such a way that it is possible to pass over the bar associated therewith. With the detent is associated a corresponding receptacle on the slide casing, so that the rotary arm can be fixed.

If the removal device is to again be connected into the operation of the machine tool, it is merely necessary to insert the piston rod, so that the channel strip again passes back into its initial position. Simultaneously the roller is lowered and the detent raised, so that the locking effect is removed. During the next rotation the known guide slot is available for the guide pulley and the rotary arm can be pivoted.

It may also be necessary for the assembly block or the slide casing to rest displaceably on a rail, instead of being fixed with respect to the tool. This rail can once again be for example mounted on a feed table, which is positioned alongside the actual machine tool or the injection molding machine. In this case it may appear to be more appropriate for the bars to be connected to the rail and also for the main rack to be fixed on the feed table or rail.

Thus, the invention also covers a machine tool for producing or working workpieces, such as for example an injection molding machine, press, punch, etc. with two tool parts movable relative to one another, whereby with at least one tool part is associated the aforementioned device. More especially related to the embodiment of an injection molding machine, then said device, with the exception of the rail and the feed table can be fixed to the stationary or movable mould half. However, it is also possible and this more particularly applies for reequipping already installed machine tools for the device with the rail and feed table to be detachably coupled by means of a coupling unit at least to one tool part or its carrier. This means that the complete robot can be placed on the feed table alongside the tool. It may obviously be necessary in individual cases for the feed table to be connected by means of corresponding struts to the machine tool support frame. However, this is not necessary in all cases.

An appropriate coupling unit is for example a simple connecting bolt connected to the slide casing and which for coupling purposes engages between two legs of the fitting plate secured to the tool part or its carrier. Uncoupling of the device takes place in simple manner by retracting the connecting bolt. However, the retraction must be limited in such a way that the connecting bolt and therefore the slide casing are always moved along during the closing of the tool.

This ensures that the handling means is always removed from the tool opening on closing the tool and can therefore suffer no damage. The simplest possibility in the present case is to shorten the leg, which carries along the connecting bolt on opening the tool. If then the connecting bolt is retracted, then the shorter leg slides past it on opening the tool and does not carry the slide casing with it. This makes it possible to carry out work between the two mould halves, in which a retracted handling unit would be prejudicial. However, if there is to be an at least partial insertion of the handling unit, then the latter will in all cases move out of the tool opening on closing the tool through the longer leg.

However, if according to a preferred embodiment the slide drive is disengaged from the slide and this is brought about by the aforementioned rotary arm, it has proved advantageous to mount rotary arm together with the slide casing for example on the movable mould half, while the guide for the slide, together with the gripping tool is fitted laterally to the mould half. However, if it is advisable from the forces standpoint to provide the slide drive for example on the other side from the slide guide on the mold half, then this can easily be realized by a corresponding design of the guide rod. As the position of the rack with respect to the machine tool is unimportant, the slide drive can be located at any random point of the mould half.

Further advantages, features and details of the invention can be gathered from the following description of preferred embodiments relative to the drawings, wherein show:

DETAILED DESCRIPTION

Figure 1:
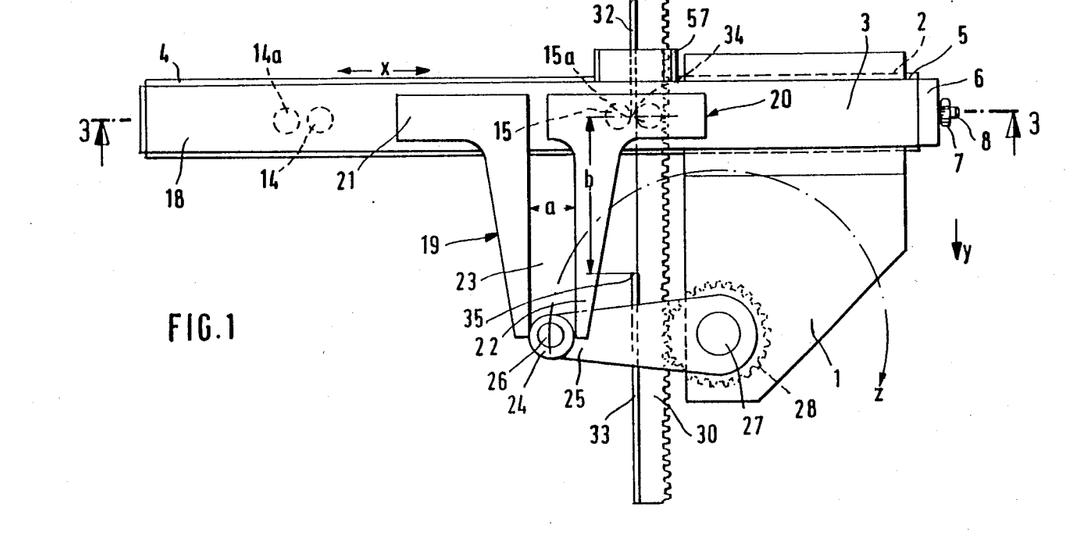
FIG. 1 a plan view of a device according to the invention for transforming a rotary movement into a linear movement.

The inventive device for transforming a rotary movement into a linear movement has, according to FIG. 1, an assembly block 1 into which is shaped a slot 2 for guiding a slide 3. Onto said slide 3 are shaped lateral rails 4, which slide in corresponding grooves 5 in slot 2.

A bar 6 is frontally fixed to the slide 3 and is traversed by a threaded bolt 8 adjustable by a nut 7. This threaded bolt 8 serves as a stop for slide 3 on one side of assembly block 1.

A further stop bolt or pin 9, which is also adjustable by means of a nut 10 is held on the other side of assembly block 1 by a tongue 12 projecting from the underside 11 of slide 3. Said stop bolt 9 can run onto a stop 13 fixed to the assembly block 1. On the underside of slide 3 are also provided two runners or rollers 14 and 15, whose axes 16 and 17 are at right angles to the movement direction x of slide 3. With said rollers 14,15 can be associated two further rollers 14a,15a.

On the top surface 18 of slide 3 are fixed two angle members 19,20 projecting with in each case one leg 21,22 laterally over the slide 3. Legs 21,22 maintain a spacing a, so that a guide slot 23 is formed between the legs 21 and 22.

Figure 2:
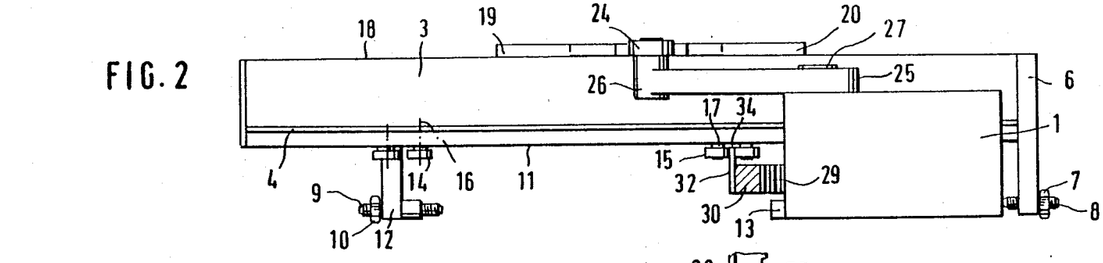
FIG. 2 a side view of the inventive device according to FIG. 1.

In said guide slot 23 engages a guide pulley 24, which is fixed to a lever 25 by means of a rotary spindle 26, at whose other ends lever 25 is located on a pivot pin 27, which is inserted in assembly block 1. In the assembly block 1 is located a pinion 28, which is axially traversed by the pivot pin 27. Part 29 (c.f. FIG. 2) of pinion 28 projects out of the assembly block 1 and meshes there with a rack 30. Rack 30 is fixed to a not shown point of a means, for example a fixed mold half of an injection molding machine for producing plastic products. On the back 31 of rack 30 are mounted two bars 32,33, which have a spacing b with respect to one another.

The aforementioned device functions in the following way. As soon as the device is moved in direction y or rack 30 is moved back in the opposite direction, pinion 28 rolls on rack 30 and moves lever 25 in direction z. The guide pulley 24 engages in the guide slot 23 between the two legs 21,22. At this instant, roller 15 travels over a control edge 34 of bar 32, so that roller 15 can travel over the rack 30. Prior to travelling over, the slide 3 is held in a secured end position by the roller 15 rolling on bar 32 and the threaded bolt 8 striking against assembly block 1. After passing over the control edge 34, runner 15 is free and can slide away within the spacing b over the rack 30.

Following a 180° rotation of guide pulley 24 in rotation direction z and while carrying the slide 3 with it, then runner 14 is inserted in the spacing b and now runs from the inside onto bar 33. Simultaneously stop bolt 9 strikes against stop 13, so that once again slide 3 is held in a secured end position.

In both end positions the guide pulley 24 can pass out of the guide slot 23, without modifying the end position of slide 3. In place of the two stop bolts 8,9, it is also possible to associate with the two runners 14,15 further runners 14a,15a, which form a gap with respect to runners 14,15, in which can be introduced to the particular bar 32 or 33. This also leads to a secured end position for slide 3.

For moving slide 3 in the reverse direction, the device is moved in the opposite direction along rack 30 and consequently lever 25 is rotated counter to the rotation direction z. The guide pulley 24 once again engages in guide slot 23 and at this instant the roller 14 travels over a control edge 35 of bar 33 and can slide out of the spacing b. Following a 180° rotation the guide pulley 24 leaves the guide slot 23 and simultaneously roller 15 runs onto the control edge 34 and the threaded bolt 8 strikes against assembly block 1.

Figure 3:
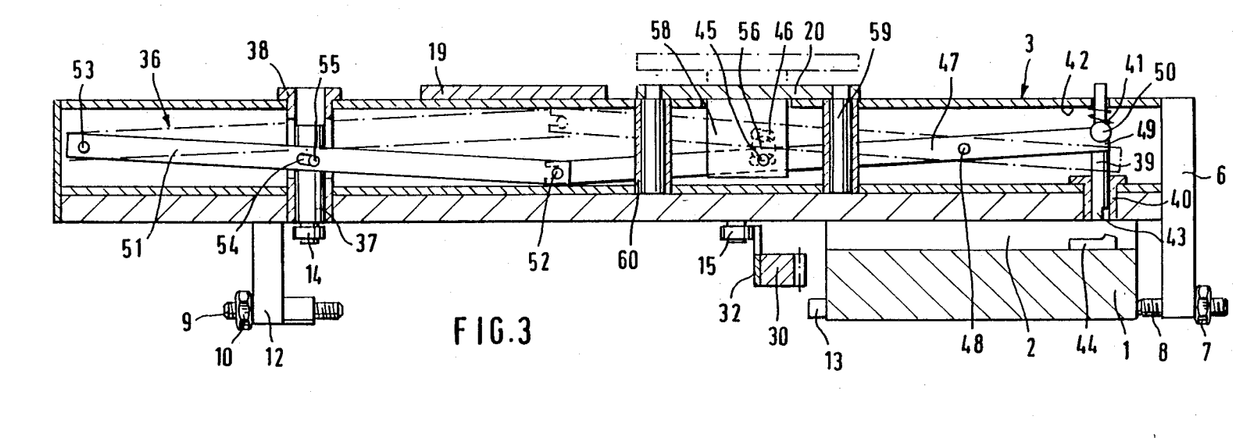
FIG. 3 a cross-section through another embodiment of an inventive device according to FIG. 1 along line 3—3.

FIG. 3 also shows a means 36 for holding the inventive device in a secured end position, e.g. in the case of a manual displacement of the device. For this purpose the roller 14 is connected to a sliding sleeve 37, which is guided in a bush 38 in slide 3. Opposite to roller 14, a locking bolt 39 passes through the slide 3 and at least partly also slide in a guide 40. Said locking bolt 39 in slide 3 bears by means of a helical spring 41 against an inner face 42 of slide 3. It also has a latch 43, which can be linked with a detent 44 on lowering the locking bolt 39.

For raising and lowering roller 14 or the locking bolt 39, an eccentrically mounted bolt 45 is provided between them, which engages in an elongated hole 46 in a profile strip 47. The latter has a fulcrum 48 between the elongated hole 46 and a support 49 and with the latter it engages below the crossbolt 50, which traverses the locking bolt 39.

At the other end of support 49, profile strip 47 is connected to a further strip 51 via a joint 52, whereby at its opposite ends strip 51 forms a fulcrum 53 in slide 3. A further elongated hole 54 is provided in strip 51 between fulcrum 53 and joint 52 and in it is suspended the sliding sleeve 57 with a crossbolt 55.

On rotating the eccentrically mounted bolt 45 about a rotary spindle 56, e.g. by means of a rotary wheel 57 shown in FIG. 1, the profile strip 47 is rotated about its fulcrum 48 and the locking bolt 39 is extended from slide 3. Simultaneously by means of joint 52 strip 51 is also raised and in this way the roller 14 is drawn into bush 38.

The roller 14 can now travel over the bar 33 and slide 3 can be held in an end position by means of the latch 43 latching in detent 44 and the threaded bolt 8 striking in assembly block 1 at this instant. For releasing means 36, the bolt 45 is rotated back into its initial position, the profile strip 47 raising the locking bolt 39 and simultaneously the roller 14 is lowered by means of strip 51.

The angle member 20 is also constructed in raisable manner. Raising can take place by means of the same eccentrically mounted bolt 45, which engages in a corresponding elongated hole in a tongue 58 connected to the angle member 20. For the better guidance of angle member 20 sliding bolts 59 are connected to either side thereof and are mounted in corresponding guide sleeves 60.

As a result of said raising of angle member 20, it is possible to bring it out of engagement with the guide pulley 24 or the latter can be moved in unimpeded manner in rotation direction z, without undesirably striking the back of the angle member 20, while slide 3 is fixed in its end position.

Figure 4:
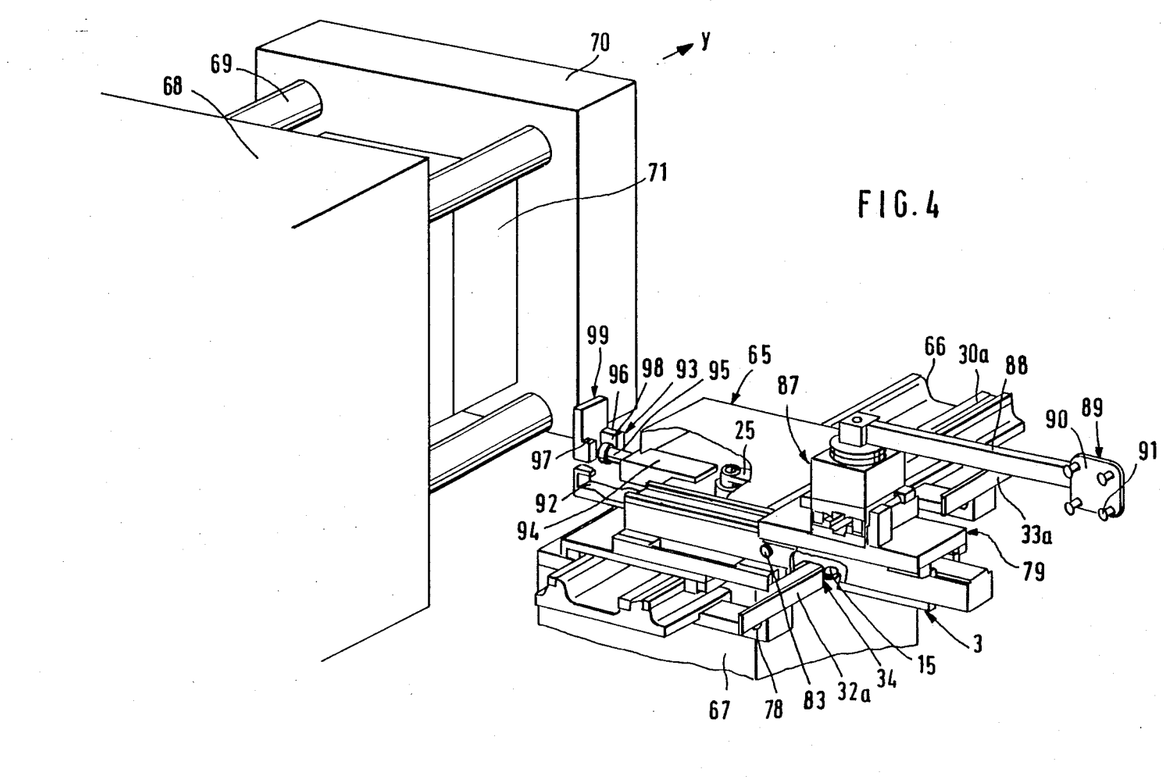
FIG. 4 a perspective, partly broken away view of the inventive device with extended handling means in the construction as a feed unit.
Figure 5:
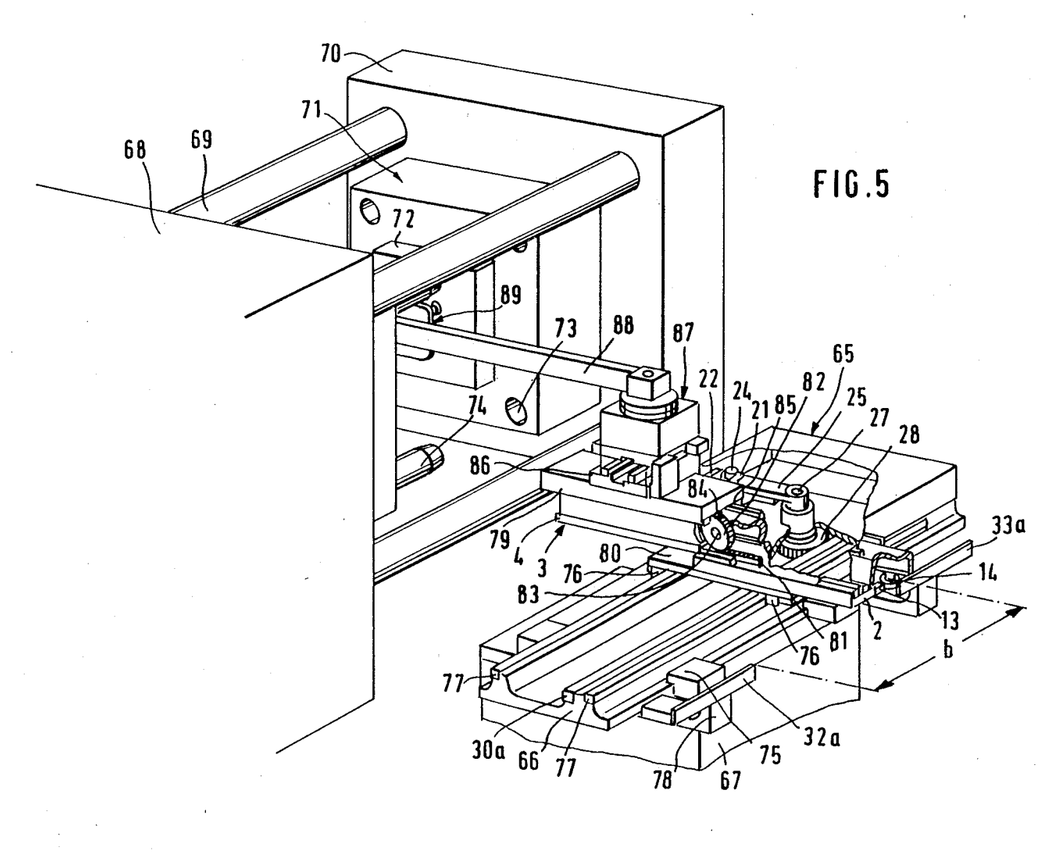
FIG. 5 a perspective, partly broken away of the device according to FIG. 4 with retracted handling means.

According to FIGS. 4 and 5, in this embodiment the assembly block is constructed as a slide casing 65, which is guided in a rail 66, which is located on a feed table 67. In the use position, feed table 67 is placed as a separate unit alongside an injection molding machine, whereof it is possible to see a fixed mold half 68 and a movable mould half 70 guidable on guide post 69.

FIG. 5 shows the movable mould half 70 in the open position, whereas FIG. 4 shows the closed position.

FIG. 5 also shows a clamping surface 71, which carries a tool part 72. The clamping surface 71 has centering bores 73, into which are introduced centering bolts 74 on closing the tool.

Injection molding machine tool in particular formed by the fixed mold half 68 and movable mould half 70 is so associated with feed table 67 and rail 66, that the latter runs parallel to the tool opening direction y, which corresponds to the movement direction y FIG. 1. Preferably the feed table is supported with respect to the injection molding tool by not shown struts or the like on its support frame or the like.

Rail 66 is held on feed table 67 by clips 75, after whose release rail 66 is also movable in direction y on feed table 67. As a result the rail 66 and therefore also the slide casing 65 can be adjusted with respect to the injection ion molding machine tool. In addition, the slide casing 65 with sliding bar 76 surrounds rail 66 or the guide bars 77 shaped thereon.

In this embodiment, rack 30a is located between the two guide bars 77 on rail 66. Therefore the rotary bolt 27 or lever 25 projects downwards out of the slide casing 65, while the pinion 28 is positioned below slide casing 65. Pinion 28 meshes with rack 30a.

In the aforementioned manner, slide 3 is guided in a slot 2 in slide casing 65, rails 4 also being provided on slide 3. The threaded bolts 8 or stop bolts 9 acting as stop elements are not shown in the present embodiment, but are provided on slide 3 in the manner indicated hereinbefore. It is only possible to see stop 13 on slide casing 65.

Bars 32a and 33a are provided for the running up of the rollers 14 or 15, but they are located on a corresponding angle member fixed to rail 66. The two bars 32a,33a have the aforementioned spacing b.

In this embodiment a further slide 79 is mounted on slide 3 and performs a movement in direction x which is geared up with respect to slide 3. For this purpose on the slide casing bottom 80 is mounted a rack 81, which is meshed by a pinion 82. Pinion 82 is mounted on a rotary spindle 83 in slide 3 and obviously slide 3 is open downwards towards rack 81. Slide 3 is also upwardly open towards slide 79, so that pinion 82 can pass through said opening and then engage with a further rack 84, which is fixed to the underside 85 of slide 79.

The transmission ratio of the slide movement in direction x to the movement of slide 79 is dependent on the choice of diameter of pinion 82. The movement of slide 3 is also brought about by means of the lever 25 and the guide pulley engaging between the two legs 21 and 22.

In the represented embodiment a rail 86 is also mounted on slide 79 and guides a further slide 87. The movement of slide 87 also takes place in direction y and can e.g. take place pneumatically. On said slide 87 is mounted an arm 88, which at the other end carries the handling means 89, which in the present embodiment comprises a plate 90 with four suction cups 91 fixed thereto. A not shown workpiece can be raised from the tool part 72 by means of said suction cups 91.

After extending the slides 3,79 and 87 from the injection molding machine tool it is possible, if desired, to pivot arm 88 by a given angle and to set down the workpiece removed. This is shown in FIG. 4. Slide 87 in particular serves to move the handling means 89 closer to the workpiece or tool part 72. Therefore it is only provided where this approximation of the handling means 89 cannot be realised by the movement of the slide 3 or 79.

FIG. 4 also shows a slit 92 in the slide casing 65 into which are past legs 21 or 22. It is also possible to see the coupling unit 93 between slide casing 65 and the movable mold half 70. Coupling unit 93 has a support profile 94 fixed to the slide casing 65 and from which a connecting bolt 95 projects towards the movable mold half 70. This connecting bolt 65 engages in a channel 98 formed by two legs 96,97 of a fitting plate 99 fixed to the movable mold half 70. Legs 97 is shorter than leg 96. If the connecting bolt 95 has been completely extended, then it is held between the two legs 96,97, so that the slide casing 65 is also guided during the opening and closing strokes of the tool. However, if the slide casing 65 and by means of the latter the complete robot unit is not to perform the opening stroke of the movable mold half 70, then it is sufficient to retract the connecting bolt 95 by a small amount, so that the shorter leg 37 can slide past it.

However, if accidentally the slide casing 65 is e.g. manually moved in direction y by a certain portion, so that possibly the handling means 89 partly enters the opening region of the two mold halves 68,70, then on closing the tool, movable mold half 70 carries the slide casing 65 with it over the longer leg 96, so that the handling means 89 is moved out of the tool. This gives a very high level of security, so that damage to the handling means 89 is avoided, but the link of the robot unit with the tool movement remains flexible.

This device functions in the following way. In the closed position of the injection molding machine tool more particularly formed by mold halves 68 and 70, the inventive device is in the position shown in FIG. 4, i.e. the handling means 89 is extended from the tool and can e.g. set down a workpiece which has been removed. If the movable mold half 70 is now moved in direction y and the connecting bolt 95 is located between the two legs 96 and 97, then the slide casing 65 is moved in direction y and is guided on rails 66. Pinion 28 rolls along rack 30a, so that lever 25 is pivoted towards the tool. At the instant where the guide pulley 24 of lever 25 engages between the two legs 21,22, the roller 15 travels over the control edge 34 on bar 32a. Thus, slide 3, which has hitherto been held between the roller 15 run up onto bar 32a and the threaded bolt 8 which has engaged against the slide casing 65, is released and is moved in direction y during the rotation of lever 25. Pinion 82 also rolls along rack 81 and consequently transfers the movement of slide 3 to rack 84 of the upper slide 79. Simultaneously or before hand arm 88 is brought into its retracted position shown in FIG. 5, so that the handling means 89 can be introduced in a sinusoidal movement between the two mold halves 68 and 70.

At the end of this sinusoidal movement the roller 14 runs behind bar 33a and simultaneously stop bolt 9 of slide 3 runs onto stop 13. At this instant the guide pulley 24 leaves the guide slot 23 between the two legs 21,22, so that on a further opening of mold half 30 slide 3 performs no further movement in direction x. Thus, handling means 89 has reached its defined end portion.

The removal of the handling means takes place in the reverse manner until roller 15 runs onto bar 32a and here again a clearly defined end position is reached.

This device makes it possible to reduce to zero the time required for removing a workpiece or e.g. for inserting an insert, because the complete introduction or removal process takes place during the opening of the mold half 70. Only in those cases were e.g. additional cleaning work by handling means 89 must be performed on tool part 72, may be necessary to stop mold half 70 until the cleaning work is completed. However, even here the time for introducing the handling means 89 is saved.

Figure 6:
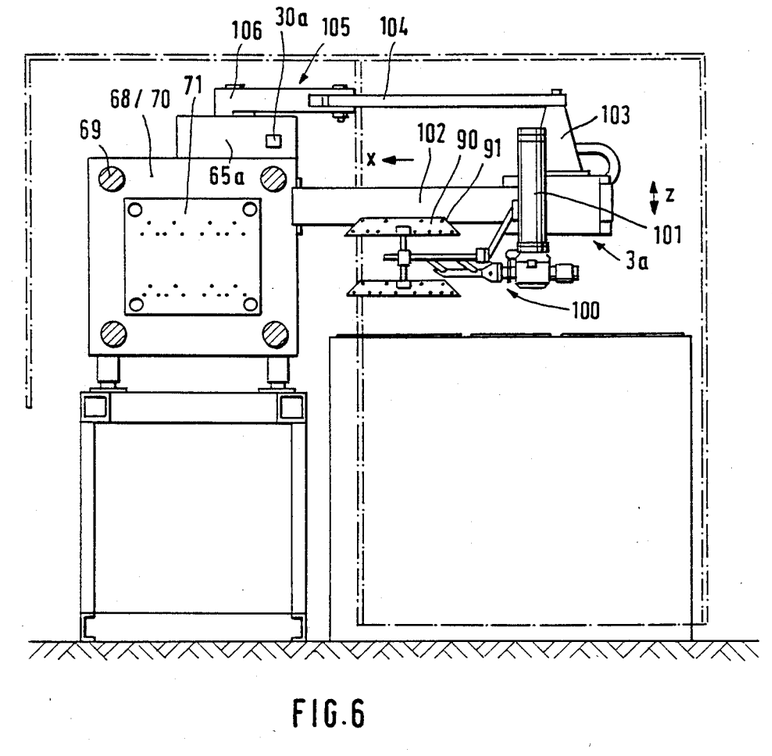
FIG. 6 a diagrammatic representation of a cross-section through an injection moulding machine with an uncoupled slide drive and slide with gripping tool.
Figure 7:
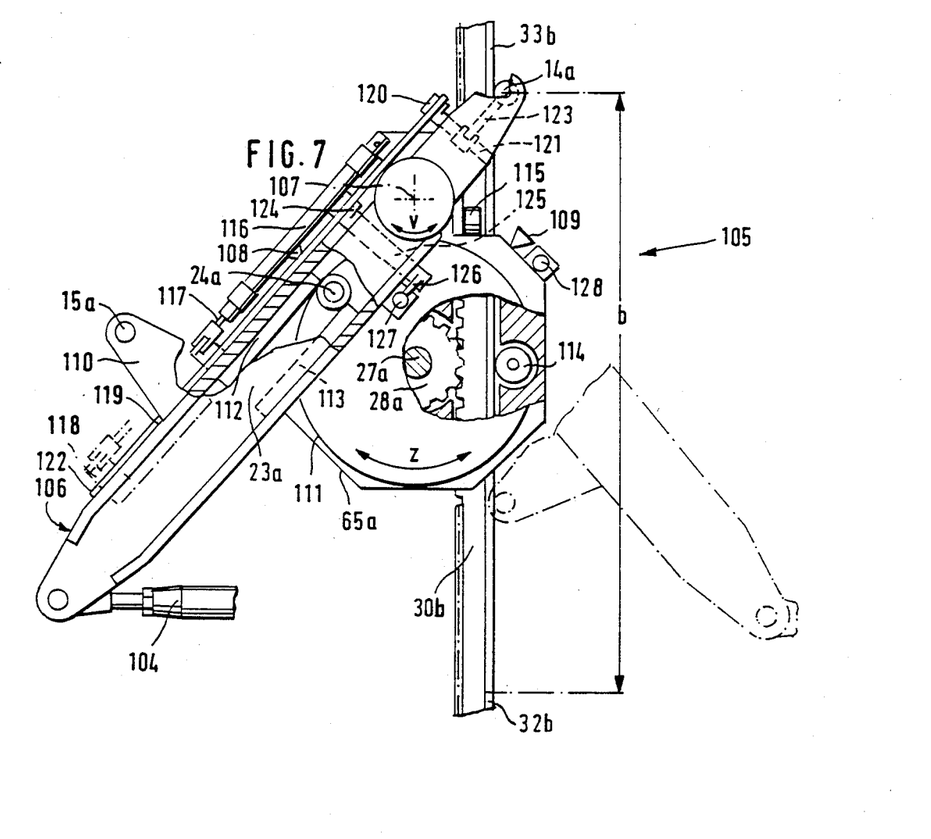
FIG. 7 a partly broken away plan view of an uncoupled slide drive according to FIG. 6.
Figure 8:
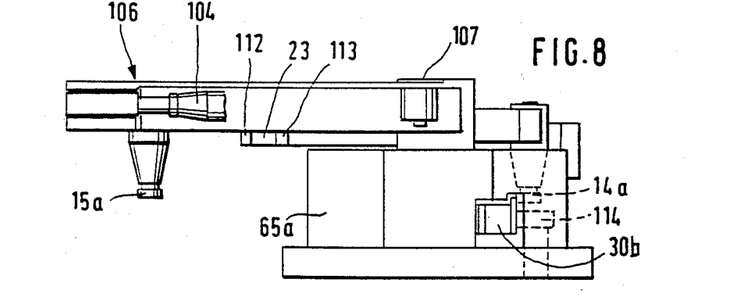
FIG. 8 a side view of the slide drive according to FIG. 7.

In a further embodiment according to FIGS. 6 to 8, FIG. 6 shows the fixed mold half 68 and movable mould half 70 of an injection molding machine. In this case, the complete gripping tool 100 comprises a pneumatic cylinder 101 fixed to slide 3 and used for the movement of plate 90, with e.g. the suction cups 91 in the z-axis. In direction x, slide 3 is displaceably mounted on a linear guide 102, which is connected to mold half 68 or 70. A fitting plate 103 projects from slide 3 and to it is articulated a guide rod 104, by means of which a connection to a slide drive 105 is produced, which is mounted on mold half 68 or 70.

Further details of slide drive 104 are given in FIGS. 7 and 8. The articulation of guide rod 104 takes place on a rotary arm 106, which is connected to a slide casing 65a. Rotary arm 106 has a fulcrum 107 with slide casing 65a about which rotary arm 106 can be pivoted in direction v. The movement of rotary arm 106 is limited by stops 108,109.

In this embodiment rollers 14a and 15a are arranged on said rotary arm 106, roller 104 being located on one side of fulcrum 107 in the end region of rotary arm 106, while roller 15 projects from a fitting plate 110.

Slide casing 65a is traversed by rack 30b, which is fixed either to the stationary or movable mold half 68 or 70. Pinion 28a is associated with rack 30b in slide casing 65a, so that meshing occurs. Disk 111 is also rotated by means of the rotary bolt 27a of pinion 28 and said disk here replaces the lever 25. Guide pulley 24a is arranged eccentrically on disk 111 and can engage in guide slot 23a. In the present embodiment guide slot 23a is formed by two spaced channel strips 112,113, which are located firmly on the rotary arm 106 and, as shown in FIG. 8, project downwards. For the better guidance of rack 30b in slide casing 65a, corresponding pressure rollers 114,115 are provided.

This embodiment functions in the following way. In the position of rotary arm 106 shown in FIG. 7, the gripping tool should be located between the two mold halves 68 and 70. Rotary arm 106 is held by stop 108 and the roller 14a rolling on bar 33. Thus, rotary arm 106 has reached a defined end position, because at this instant the guide pulley 24a leaves the guide slot 23. The movable mold half 70 can be further opened, the rack 30b continuing to rotate pinion 28a and therefore also the guide pulley 24a. This permits an approximately 270° travel over the end position. On closing mold half 70, disk 111 rotates in the opposite direction, so that the guide pulley 24a can again be introduced into the guide slot 23a in the shown manner. During a further rotation, the guide pulley 24a carries with it the rotary arm 106 and the latter rotates about fulcrum 107. Only in the position of rotary arm 106 represented in broken line form, in which it has reached its other end stop, does the guide pulley 24a again travel out of the guide slot 23a. At this time the other roller 15a has travelled over the free space between the two bars 32b and 33b and can now slide onto bar 32b. Thus, rotary arm 106 is fixed between stop 109 and bar 32b. At this instant, gripping tool 100 has moved completely out of the two mold halves 86 and 70.

In this embodiment there are once again further devices for uncoupling said slide drive 105 from the movement of mold half 86 or 70. For this purpose laterally on rotary arm 106 is provided a pneumatic cylinder 116, whose piston rod 117 is connected by means of a connecting angle member 118 to channel strip 112. As a result of the extension of piston rod 117, channel strip 112 is brought out of the engagement zone with guide pulley 24a, as shown by broken lines in FIG. 7. However, channel strip 113 remains at its intended position, so that in this case on rotating disk 111, the rotary arm 106 is brought into its position shown in broken line form, where the gripping tool has passed out of the mould halves 86 or 70. However, pivoting of rotary arm 106 is no longer possible, because the channel strip 112 has been brought out of the engagement zone of guide pulley 24a.

It is also necessary in certain applications to fix the rotary arm 106 in the broken line position, i.e. with the gripping tool 100 extended. Thus, before the connecting angle member 118 reaches its extended end position it meets an angle member 122 projecting from a link strip 119 and carries the latter with it for a short distance. At the other end of said angle member 122, link strip 119 is connected in articulated manner with a rotary lever 120, which is shaped onto a rotary bolt 121, which passes through the rotary arm 106. A lifting rod 123 projects from rotary bolt 121 and enables the roller 14a to be raised. Thus, roller 14a is disengaged from the bar 33b, so that the rotary arm 106 is freely movable.

In the same way, a further rotary lever 124 and rotary bolt 125 is connected to link strip 119. However, unlike in the case of rotary lever 124, a lever 126 is provided at the other end of rotary bolt 125 and this is linked with a detent 127. This arrangement ensures that on moving the rotary level 124 with the link strip 119 detent 127 is lowered. Thus, detent 127 latches in a receptacle 128 or the end face of the ratchet is, as shown, chamfered, so that it can slide onto a wall of receptacle 128 and can then be latched in the latter, so that rotary arm 106 is securely held.

So that it can again be connected into the working operation of the injection molding machine, the piston rod 117 is retraced into pneumatic cylinder 116, so that the link returns to its starting position. Thus, the roller 14a is again lowered and the detent 127 is raised out of the receptacle 128. The channel strip 112 also returns to its starting position, so that it comes into the engagement zone of guide pulley 24a and consequently the rotary arm 106 is carried along, so that slide drive 105 is put into operation.

I claim:

1. Device for transforming a rotary movement of a drive element eccentrically arranged about a rotary spindle into a linear movement of a slide means with an assured guidance during the linear movement and fixed end positions, whereby for the linear guidance of the slide means the drive element constructed as a guide pulley engages in a guide slot, but leaves the latter on reaching the slide means end position, characterized in that on the slide means (3) are provided two rollers (14,15) as stops, which in the end positions of slide means (3) in each case slide onto and engage on bars (32,33) as a reference edge, said bars (32,33) freeing the rollers (14,15) during the linear guidance of said slide means (3) and are arranged with a spacing (b) each to the other.

2. Device according to claim 1, characterized in that for holding the rollers (14,15) on the particular bar (32,33), further stops (14a,15a,8,9,108,109) are provided directed towards bar (32,33) and in each case counter to the pressure direction of roller (14,15).

3. Device according to claim 2, characterized in that with the rollers (14,15) is associated in each case one further roller (14a,15a), which at the other side of the particular roller (14,15) engages with said bar (32 or 33).

4. Device according to claim 2, characterized in that stop bolts (8,9) are fixed on slide (3) and meet a fixed stop (13 or 1).

5. Device according to claim 4, characterized in that the stop bolts (8,9) are adjustable.

6. Device according to claim 4, characterized in that the bars (32,33) are arranged at right angles to the movement direction (x) of slide (3).

7. Device according to claim 1, characterized in that on the rotary spindle (27) for the movement of guide pulley (24) is mounted a pinion (28), which meshes with a rack (30), the rack (30) and pinion (28) being movable relative to each other.

8. Device according to claim 7, characterized in that the bars (32,33) are connected to the rack (30).

9. Device according to claim 7, characterized in that the rotary spindle (27), pinion (28) and slide (3) are jointly arranged with at least one of an assembly block (1) and slide casing (65).

10. Device according to claim 1, characterized in that a means (36) for fixing slide (3) in its end position is provided in or on slide (3).

11. Device according to claim 10, characterized in that means (36) comprises at least one locking bolt (39), which cooperates with a detent (44) in the locked position.

12. Device according to claim 11, characterized in that the locking bolt (39) with a cross-bolt (50) rests on a support (49) formed by a profile strip (47) and is raised therefrom counter to the tension of a spring (41).

13. Device according to claim 12, characterized in that the profile strip (47) has a fulcrum (48) with slide (3) and in its further course an elongated hole, which is traversed by an eccentrically rotatable bolt (45).

14. Device according to claim 1, characterized in that at least one of the rollers (14) can be raised.

15. Device according to claim 14, characterized in that the profile strip (47) is connected by means of a joint (52) to a further strip (51), which at its remote end has a fulcrum (53) with respect to slide (3) and an interposed elongated hole (54), in which engages a crossbolt (55) connected to roller (14).

16. Device according to claim 10, characterized in that the guide slot (23) is formed by two angle members (19,20) with legs (21,22), one angle member (20) being raisable.

17. Device according to claim 16, characterized in that the raising of angle member (20) takes place by means of the eccentrically rotatable bolt (45).

18. Device according to claim 1, characterized in that on slide (3) is placed a further slide (79), a pinion (82) forming with slide (3) a rotary spindle (83) and said pinion (82) on the one hand rolls along a rack (81) fixed with respect to slide (3) in direction (x) and on the other hand meshes with a rack (84) fixed to slide (79).

19. Device according to claim 1, characterized in that a carrier (86, 87, 88) for a handling means (89) is connected either to slide (3) or to slide (79).

20. Device according to claim 9, characterized in that the slide casing (65) is mounted on a rail (66), which is arranged in movement direction (y) approximately at right angles to the movement direction (x) of slide (3).

21. Device according to claim 20, characterized in that said rail (66) rests in a displaceable manner on a feed table (67).

22. Device according to claim 20, characterized in that the bars (32a,33a) are connected to rail (66).

23. Device according to claim 20, characterized in that the rack (30a) is connected to rail (66) for engaging in pinion (28).

24. Device according to claim 9, characterized in that the slide (3a) is connected by means of a guide rod (104) to a rotary arm (106), on which are provided rollers (14a, 15a) as stops.

25. Device according to claim 24, characterized in that the rotary arm (106) has a fulcrum (107) with respect to the slide casing (65a) and is pivotable in direction (v).

26. Device according to claim 25, characterized in that two channel strips (112,113) are connected to rotary arm (106) and form the guide slot (23a) for guide pulley (24a).

27. Device according to claim 26, characterized in that a channel strip (112) can be moved out of the engagement zone of guide pulley (24a).

28. Device according to claim 27, characterized in that channel strip (112) is connected to a piston rod (117) of a cylinder (116).

29. Device according to claim 28, characterized in that cylinder (116) is fixed to rotary arm (106).

30. Device according to claim 28, characterized in that by means of cylinder (116) or its piston rod (117) it is possible to move a link strip (119), which raises or lowers a roller (14a) and/or a detent (127).

31. Device according to claim 30, characterized in that the link strip (119) is connected by means of a rotary lever (120) to a rotary bolt (121), which is connected by means of a lifting rod (123) on same side as rotary lever (120).

32. Device according to one of the claim 30, characterized in that the link strip (119) is connected by means of a further rotary lever (124) and a rotary bolt (125), as well as a lever (126) arranged on the other side of the rotary level (124) with the detent (127).

33. Device according to claim 30, characterized in that with the detent (127) on slide casing (65a) is associated a receptacle (128).

34. Machine tool for producing or working workpieces, such as an injection molding machine, press, punch, etc. with two tool parts movable relative to one another and whereby with at least one tool part is associated a device according to claim 1, characterized in that the device is fixed to at least one tool part (72) and its carrier (70,68).

35. Machine tool for producing or working workpieces, such as an injection molding machine, press, punch, etc. with two tool parts movable relative to one another, whereby with at least one tool part is associated a device according to claim 1, characterized in that the device is detachably coupled to at least one tool part (72) and its carrier (70,68) by means of a coupling unit (93).

36. Machine tool according to claim 35, characterized in that the coupling unit comprises a connecting bolt (95) connected to the assembly block (1) or slide casing (65) and which for uncoupling purposes engages between two legs (96,97) of a fitting plate (95) fixed to the tool part (72) and its carrier (70,68).

37. Machine tool according to claim 36, characterized in that one leg (97) is shorter than the other leg (96) and the connecting bolt (95) can be retracted by the length of the shorter leg (97).

38. Machine tool for producing or working workpieces, such as an injection molding machine, press, punch, etc. with two tool parts movable relative to one another and whereby with at least one tool part is associated a device according to claim 1, characterized in that the slide (3a) is fixed by means of a corresponding guide (102) to one mold half (68,70) and is connected by means of a guide rod (104) to the rotary arm (106) by means of the sliding casing (65a).

39. Machine tool according to claim 38, characterized in that the rack (30b) traverses the slide casing (65a) and meshes there with pinion (28a).

* * * * *